(12) United States Patent
Goldberg et al.

(10) Patent No.: US 11,159,475 B2
(45) Date of Patent: Oct. 26, 2021

(54) SENDING A READ RECEIPT TO EACH USER SPECIFIED ON A READ RECEIPT DISTRIBUTION LIST

(71) Applicant: International Business Machines Corporation, Armonk, NY (US)

(72) Inventors: Itzhack Goldberg, Hadera (IL); Bruce A. Kahn, Hudson, MA (US); Boaz Mizrachi, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 632 days.

(21) Appl. No.: 13/893,836

(22) Filed: May 14, 2013

(65) Prior Publication Data

US 2014/0344369 A1 Nov. 20, 2014

(51) Int. Cl.
*H04L 12/58* (2006.01)

(52) U.S. Cl.
CPC .................. *H04L 51/34* (2013.01)

(58) Field of Classification Search
CPC ............ H04L 51/34; H04L 12/5885; H04L 12/5875; H04L 51/00; H04L 51/30; H04L 51/22; H04L 51/02; H04L 51/066; H04L 29/06; H04L 51/12; H04L 51/14; H04L 12/5855; H04L 69/329; H04L 12/58; H04L 51/36; G06Q 10/10; G06Q 10/06; G06Q 10/107; G06Q 30/0633; H04W 88/184
See application file for complete search history.

(56) References Cited

U.S. PATENT DOCUMENTS

| | | | | |
|---|---|---|---|---|
| 5,878,230 A | * | 3/1999 | Weber ................... | H04L 51/02 379/93.24 |
| 7,085,812 B1 | * | 8/2006 | Sherwood ........... | H04L 12/5875 709/206 |
| 7,562,118 B2 | * | 7/2009 | Fellenstein ............. | H04L 51/30 379/265.09 |
| 7,836,132 B2 | * | 11/2010 | Qureshi ................. | H04L 51/30 709/206 |
| 9,177,293 B1 | * | 11/2015 | Gagnon ............... | G06Q 10/107 |
| 2002/0144154 A1 | * | 10/2002 | Tomkow ............... | H04L 63/123 726/1 |

(Continued)

OTHER PUBLICATIONS

"Email Management: Cure Enterprise Email Overload and Share Information," [online] Terazen Technology, Inc. © 2010 [retrieved Feb. 14, 2013] retrieved from the Internet: <http://www.taglocity.com/, 1 pg.

*Primary Examiner* — Kevin T Bates
*Assistant Examiner* — Ranjan Pant
(74) *Attorney, Agent, or Firm* — Cuenot, Forsythe & Kim, LLC

(57) ABSTRACT

Processing electronic mail includes receiving an electronic mail having a read receipt request and determining, using a processor, that the electronic mail includes a read receipt distribution list. The read receipt distribution list specifies at least one sender-defined user including a subset of at least one recipient of the electronic mail. Using the processor, a read receipt is sent to the sender of the electronic mail and to each user specified on the read receipt distribution list responsive to detecting an opening of the electronic mail by at least one recipient of the electronic mail.

19 Claims, 3 Drawing Sheets

(56) References Cited

U.S. PATENT DOCUMENTS

| | | | |
|---|---|---|---|
| 2003/0153302 A1* | 8/2003 | Lewis | H04L 51/12 |
| | | | 455/412.1 |
| 2005/0021650 A1* | 1/2005 | Gusler | H04L 51/30 |
| | | | 709/207 |
| 2008/0052362 A1* | 2/2008 | Bauchot | G06Q 10/107 |
| | | | 709/206 |
| 2008/0155026 A1 | 6/2008 | Daniels-Farrar et al. | |
| 2009/0077045 A1* | 3/2009 | Kirchmeier | G06Q 10/06 |
| 2009/0138557 A1* | 5/2009 | Lyle | G06Q 10/107 |
| | | | 709/206 |
| 2010/0125636 A1* | 5/2010 | Kuhlke | G06Q 10/107 |
| | | | 709/206 |
| 2010/0275021 A1* | 10/2010 | Kristiansen | H04L 9/088 |
| | | | 713/171 |
| 2012/0179767 A1* | 7/2012 | Clarke | H04L 51/34 |
| | | | 709/206 |
| 2012/0231770 A1* | 9/2012 | Clarke | H04L 51/34 |
| | | | 455/414.1 |
| 2012/0327781 A1* | 12/2012 | Dabbs, III | H04W 4/06 |
| | | | 370/241 |

* cited by examiner

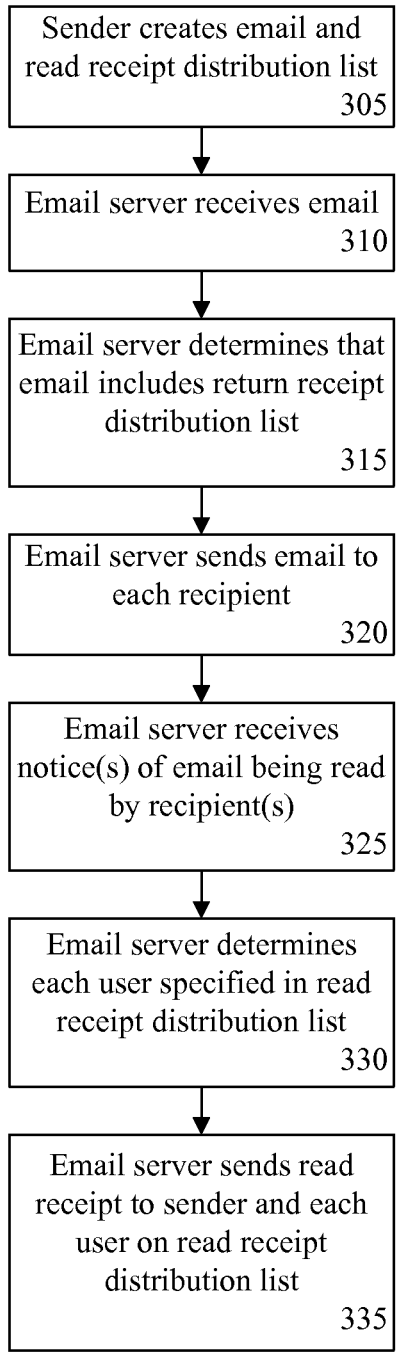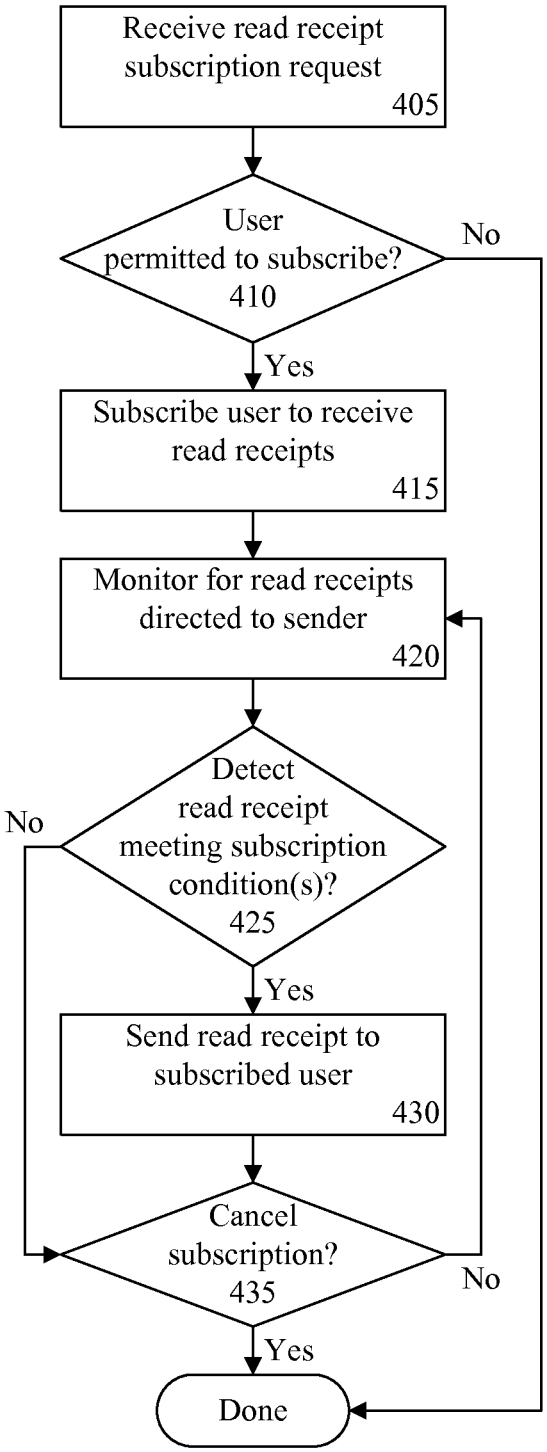
FIG. 3
FIG. 4

SENDING A READ RECEIPT TO EACH USER SPECIFIED ON A READ RECEIPT DISTRIBUTION LIST

BACKGROUND

Electronic mail (email) has become ubiquitous. Whether in a work environment or for personal use, users rely extensively upon email to communicate and collaborate with others. Unlike other more immediate forms of communication that operate in real-time or in near real-time, e.g., telephone calls or instant messaging, email is an asynchronous form of communication. A recipient of an email may or may not respond immediately to a received email leaving the sender unaware of the status of the email.

Email tracking mechanisms have been developed, in part, to better contend with the asynchronous nature of email. Email tracking mechanisms attempt to alleviate some of the uncertainty surrounding various aspects of email such as delivery and receipt by providing senders with status information for sent emails. One example of an email tracking mechanism is the use of different types of "receipts." A "delivery receipt" is a message provided to a sender of an email indicating that the email was successfully delivered to a recipient email system. A "read receipt" is a message provided to a sender indicating that a recipient, working through a client system, opened an email.

BRIEF SUMMARY

A method includes receiving an electronic mail having a read receipt request and determining, using a processor, that the electronic mail includes a read receipt distribution list. The read receipt distribution list specifies at least one sender-defined user including a subset of at least one recipient of the electronic mail. The method further includes sending, using the processor, a read receipt to the sender of the electronic mail and to each user specified on the read receipt distribution list responsive to detecting an opening of the electronic mail by at least one recipient of the electronic mail.

A system includes a processor programmed to initiate executable operations. The executable operations include receiving an electronic mail having a read receipt request and determining that the electronic mail includes a read receipt distribution list. The read receipt distribution list specifies at least one sender-defined user including a subset of at least one recipient of the electronic mail. The executable operations further include, sending a read receipt to the sender of the electronic mail and to each user specified on the read receipt distribution list responsive to detecting an opening of the electronic mail by at least one recipient of the electronic mail.

A computer program product for processing electronic mail includes a computer readable storage medium having program code stored thereon. The program code is executable by a processor to perform a method. The method includes receiving an electronic mail having a read receipt request and determining, using the processor, that the electronic mail includes a read receipt distribution list. The read receipt distribution list specifies at least one sender-defined user including a subset of at least one recipient of the electronic mail. The method further includes, using the processor, sending a read receipt to the sender of the electronic mail and to each user specified on the read receipt distribution list responsive to detecting an opening of the electronic mail by at least one recipient of the electronic mail.

BRIEF DESCRIPTION OF THE SEVERAL VIEWS OF THE DRAWINGS

FIG. 3 is a flow chart illustrating an exemplary method of email processing.

FIG. 4 is a flow chart illustrating another exemplary method of email processing.

DETAILED DESCRIPTION

Figure 1:
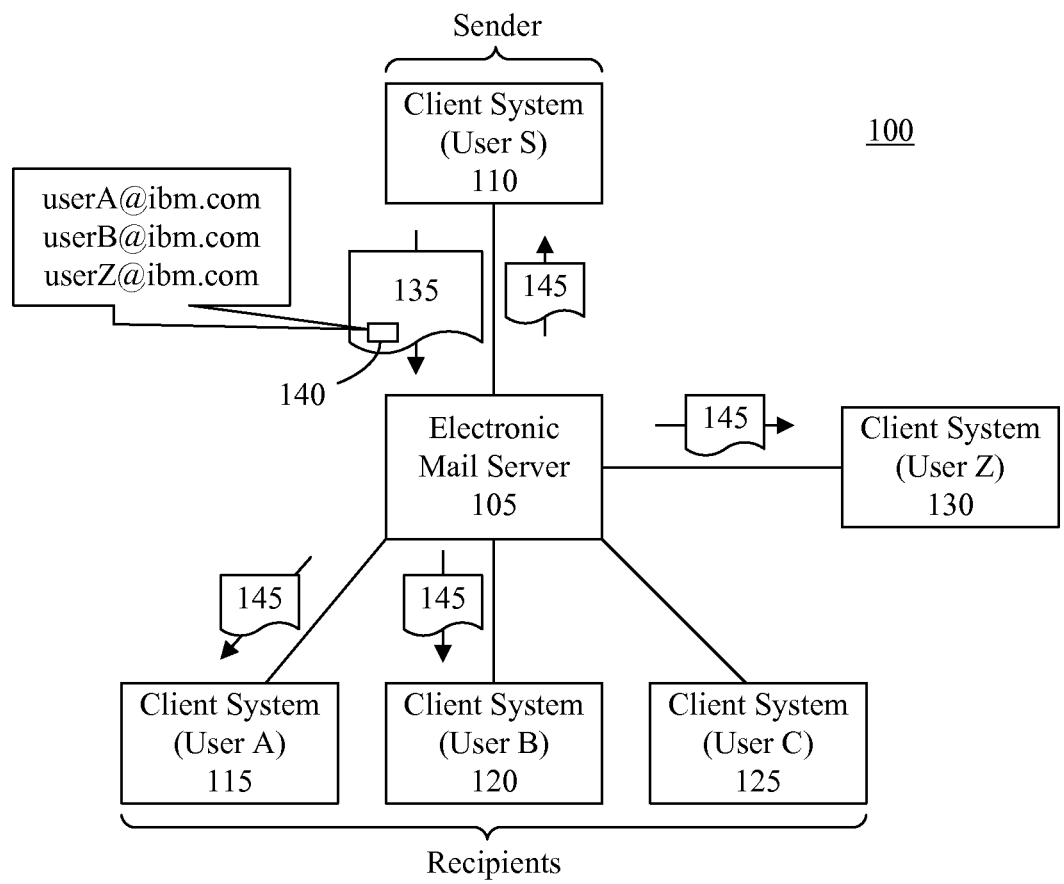
FIG. 1 is a block diagram illustrating an example of an electronic mail (email) system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

This specification relates to electronic mail processing and, more particularly, to processing read receipts for electronic mail. In accordance with the inventive arrangements disclosed within this specification, an electronic mail (email) can be created that includes a read receipt distribution list. The read receipt distribution list specifies one or more users to which a read receipt is to be sent. In one example, the read receipt distribution list specifies a one or more or all recipients of the email. In another example, the read receipt distribution list specifies a limited number of users, i.e., a subset, of all recipients of the email. In still another example, the read receipt distribution list specifies one or more other users that are neither recipients nor the sender of the email. A read receipt is provided to each of the users specified on the read receipt distribution list. A read receipt further can be provided to the sender despite not being included or otherwise specified on the read receipt distribution list.

In another aspect, one or more users are provided with the ability to subscribe to read receipts. For example, a first user, under certain defined conditions, can subscribe to read receipts received by, or directed to, a second and different user. In still other cases, a data processing system is configured to detect conditions, automatically, under which a user that is neither a sender nor a recipient of an email is to receive a read receipt for the email. These and other aspects are described below in greater detail with reference to the drawings.

FIG. 1 is a block diagram illustrating an exemplary email system 100. Email system 100 includes an email server 105. Email server 105 is communicatively linked with a plurality of client systems such as client systems 110, 115, 120, 125, and 130. Email server 105 is implemented as a data processing system. Each of client systems 110-130 also is implemented as a data processing system including, for example, a communication and/or mobile device. Email server 105 communicates with client systems 110-130 over a network (not shown). The network can be implemented as, or include, any of a variety of different networks such as a WAN, a LAN, a wireless network, a mobile network, a Virtual Private Network (VPN), the Internet, the Public Switched Telephone Network (PSTN), or the like.

In the example pictured in FIG. 1, each of client systems 110-130 can be operated by a user. The term "user" means a human being that is operating and/or accessing a particular client system. As pictured, user S accesses client system 110. User A accesses client system 115. User B accesses client system 120. User C accesses client system 125. User Z accesses client system 130. Each of client systems 110-130 can be said to be "associated" with the particular user that is operating or accessing the client system. Each of client systems 110-130 can execute an email program, e.g., an email client application, which operates cooperatively with email server 105 so that the user of the client system is able to send and/or receive email as the case may be.

For purposes of illustration, user S is a sender since user S sends email 135 using client system 110 in cooperation with email server 105. As such, client system 110 can be referred to as a "sender client system." Each of users A, B, and C is a recipient in that each of users A, B, and C, through his or her respective client system in cooperation with email server 105, can receive one or more emails such as email 135. Accordingly, each of client systems 115-125 can be referred to as a "recipient client system."

Within this specification, a reference to a particular user may also refer to the client system associated with, or used by, that user. Similarly, a reference to a particular client system may also refer to the user associated with that client system. For example, when user S sends an email to user A, it is understood that the email is sent from client system 110 to client system 115 by way email server 105.

Email server 105 receives emails from one or more client systems for delivery to one or more other client systems. Email server 105 further is configured to perform read receipt processing as described within this specification. While email server 105 is pictured as a single data processing system, it should be appreciated that email server 105 can be implemented as one or more interconnected data processing systems.

In operation, client system 110 creates email 135. Email 135 specifies users A, B, and C as recipients. As such, each of users A, B, and C is specified in at least one of a "To" field, a carbon copy or "CC" field, or a blind copy or "BC" field of email 135. In one aspect, as part of creating email 135, client system 110 also creates a return receipt distribution list 140 that is included as part of email 135. As pictured in FIG. 1, read receipt distribution list 140 specifies one or more users. Each user specified by read receipt distribution list 140 is to receive a read receipt for email 135.

In one aspect, read receipt distribution list 140 specifies one or more of the recipients of email 135. For example, read receipt distribution list 140 can specify each recipient of email 135. In another example, read receipt distribution list 140 can specify fewer than all recipients of email 135. In still another example, read receipt distribution list 140 can specify one or more users that are neither the sender nor a recipient of email 135. In general, user S is able to specify with particularity, e.g., on a per user basis, which users are to receive a read receipt 145 for email 135.

In the example illustrated in FIG. 1, read receipt distribution list 140 specifies a subset of the recipients. Within this specification, a "subset" means less, or fewer, than all. Accordingly, a "subset of the recipients" or a "subset of all of the recipients" means fewer, or less, than all of the recipients of an email. As shown, read receipt distribution list 140 specifies an address for each of user A and user B, e.g., both recipients. While user C is also a recipient, user C is not specified by read receipt distribution list 140 and, as such, is not to be provided with a read receipt 145 for email 135. Read receipt distribution list 140 also specifies user Z. User Z is not the sender of email 135. Further, user Z is not a recipient of email 135. Still, user Z, like users A and B, will receive read receipt 145 for email 135.

Read receipt distribution list 140 is pictured as specifying email addresses for each of the users intended to receive read receipt 145. It should be appreciated, however, that the way in which a user is specified, e.g., using an email address, a user name, another identifier, etc., can vary and is not intended as a limitation of the one or more embodiments disclosed within this specification.

In any case, email server 105 can identify email 135 as having a read receipt request and, further, including a read receipt distribution list 140. Accordingly, responsive to receiving indications from one or more or all of client systems 115, 120, and 125 that a respective user has read email 135, email server 105 sends read receipt 145 to each of the users specified on the read receipt distribution list 140, i.e., user A, user B, and user Z, and further to user S.

Email system 100 provides various benefits in terms of email processing. For instance, those users that receive a read receipt would know the particular email recipients that read an email, but did not respond. Knowing whether the email was read by one or more other particular recipients may be instructive as to whether another one should respond to the sender. For example, in some cases a user may wait for a superior to respond, but lose track of the email, without responding, while awaiting the response from their superior.

In other cases, a recipient replies only to the sender, which leaves the other recipients unaware that a response has been sent. This behavior defeats the purpose of specifying multiple recipients on an email in an effort to invoke discussion among the recipients and/or sender. In addition, without providing receipts to others, only the sender is notified that an email was received and/or read by each of the email recipients.

Figure 2:
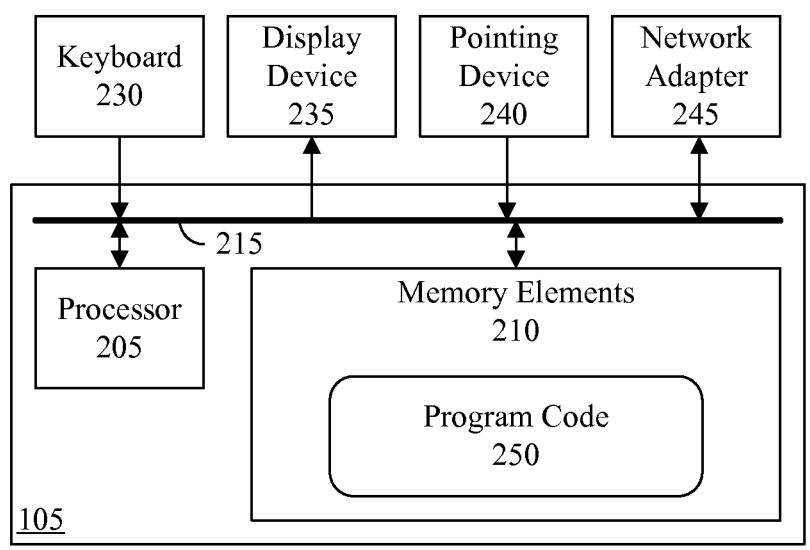
FIG. 2 is a block diagram illustrating an exemplary architecture for a data processing system.

FIG. 2 is a block diagram illustrating an example of a data processing system (system) 200. System 200 illustrates an exemplary implementation and/or architecture for client systems 110-130 and/or email server 105 of FIG. 1. As pictured, system 200 can include at least one processor 205, e.g., a central processing unit, coupled to memory elements 210 through a system bus 215 or other suitable circuitry. System 200 can store program code within memory elements 210. Processor 205 executes the program code accessed from memory elements 210 via system bus 215 or the other suitable circuitry.

In one aspect, system 200 is implemented as a computer or other programmable data processing apparatus that is suitable for storing and/or executing program code. It should be appreciated, however, that system 200 can be implemented in the form of any system including a processor and memory that is capable of performing and/or initiating the functions and/or operations described within this specification.

Memory elements 210 include one or more physical memory devices such as, for example, local memory and one or more bulk storage devices. Local memory refers to RAM or other non-persistent memory device(s) generally used during actual execution of the program code. A bulk storage device can be implemented as a hard disk drive (HDD), solid state drive (SSD), or other persistent data storage device. System 200 also can include one or more cache memories (not shown) that provide temporary storage of at least some program code in order to reduce the number of times program code must be retrieved from a bulk storage device during execution.

Input/output (I/O) devices such as a keyboard 230, a display device 235, and a pointing device 240 optionally can be coupled to system 200. The I/O devices can be coupled to system 200 either directly or through intervening I/O controllers. One or more network adapters 245 also can be coupled to system 200 to enable system 200 to become coupled to other systems, computer systems, remote printers, and/or remote storage devices through intervening private or public networks. Modems, cable modems, wireless transceivers, and Ethernet cards are examples of different types of network adapters 245 that can be used with system 200.

System 200 can be implemented in any of a variety of different form factors. As a server, for example, system 200 may or may not include I/O devices such as keyboard 230, display 235, and/or pointing device 240. As a client system, system 200 can be implemented as a personal computer, a portable computer, e.g., a laptop, a tablet, a mobile communication device, or the like. For example, system 200 can include I/O devices such as keyboard 230, display device 235, and pointing device 240 in any of a variety of different configurations, e.g., as an integrated display device in the form of a flat panel display or touchscreen that replaces keyboard 230 and/or pointing device 240, etc.

As pictured in FIG. 2, memory elements 210 can store program code 250. Program code 250 can include an operating system and appropriate application software. In the case of email server 105, for example, program code 250 represents a server operating system and email processing software that, when executed, performs the various server-side operations described within this specification. In the case of a client system, program code 250 represents an operating system and an email client application that, when executed, performs the various client-side operations described within this specification. It should be appreciated that program code 250, any parameters and/or attributes utilized by program code 250, e.g., read receipt distribution lists, return receipts, emails, or the like, are functional data structures that impart functionality when employed as part of system 200.

FIG. 3 is a flow chart illustrating an exemplary method 300 of email processing. With the exception of block 305, FIG. 3 generally illustrates operations performed by the email server described with reference to FIG. 1. As pictured, FIG. 3 illustrates operations that can be performed by the email server in order to provide read receipts to one or more recipients, the sender, and/or a user that is neither a sender nor a recipient.

In block 305, the sender creates an email and a read receipt distribution list. The sender, working through a suitable sender client system, creates an email. As part of the email, the sender requests a read receipt and, in doing so, specifies a read receipt distribution list. The read receipt distribution list can be specified at the time of, or during, creation of the email.

In one aspect, the read receipt distribution list is created by the sender as opposed to being automatically generated by the sender client system. As such, the sender can be presented with a list and/or directory from which to select users to add to the read receipt distribution list. The sender, for example, can be presented with each of the recipients of the email as an option to include within the read receipt distribution list. The sender further can be presented with a field or other user interface element through which the sender can specify one or more other users, or user addresses, (i.e., users not a recipient and other than the sender) to be added to the read receipt distribution list.

In this manner, the read receipt distribution list includes "sender defined" users as the sender is able to specify each user included on the read receipt distribution list on an individual basis. In one implementation, the read receipt distribution list includes only sender defined users, though this need not be the case. The users specified on the read receipt distribution list can include each recipient, a subset of the recipients, and/or a third party user, meaning a user that is not a recipient or a sender of the email. In one aspect, the sender is presumed to receive a read receipt and need not be specified on the read receipt distribution list.

In block 310, the email server receives the email from the sender client system. The email includes a read receipt request and the read receipt distribution list. In block 315, the email server determines that the email includes a read receipt distribution list. The email server further determines that the email includes the read receipt request. In one aspect, the email server can store the read receipt distribution list in association with the email, a reference to the email, or a reference to a discussion thread within which the email is included. The email server can store the read receipt distribution list within a data storage device of the email server itself or within one that is communicatively linked with the email server.

In block 320, the email server sends the email to each recipient. For example, the email server places the email within an inbox of the account of each recipient. In block 325, the email server receives one or more notifications of the email being read by a recipient. As known, when an email is sent with a request for a read receipt, the recipient is prompted as to whether to send a read receipt upon opening or viewing the email. Responsive to one or more or all of the recipients opening the email, the respective recipient client system sends a notification that the email was read to the email server. In one aspect, the notification can be a client system generated read receipt.

In block 330, the email server determines each user specified in the read receipt distribution list. For example, responsive to receiving the read receipt for the email, the email server looks up the read receipt distribution list associated with the email to which the notification is associated. The email server determines, from the read receipt distribution list, each user specified therein. In block 335, the email server sends a read receipt to the sender and to each user on the read receipt distribution list.

In one aspect, the read receipt, when received by a user on the read receipt distribution list, appears as though the read receipt was sent or provided by the recipient that opened the email. For example, the read receipt, as received within the client of each user on the read receipt distribution list, does not appear as a forwarded version of the read receipt from the sender.

In another aspect, read receipts can be provided to users in a more intuitive way. For example, rather than sending a separate message that is displayed within an inbox of each user receiving the read receipt, the read receipt can be indicated within a client system using an icon, tag, flag, or other identifier next or proximate to the email to which the read receipt corresponds. When the user selects or hovers over the indicator, content of the indicator can be displayed. In this manner, the read receipt is not handled as a separate email received within an inbox of the client system. Further, a single indicator can be displayed that, when selected, displays which recipients have sent read receipts. The identifier can be updated with information as additional read receipts are received for a given email. Such a configuration avoids sending and showing a separate message as a read receipt within the inbox of the sender each time a different recipient reads the email.

Though FIG. 3 has been described from the perspective of the email server, one or more aspects described with reference to FIG. 3 can be performed by a client system. In one aspect, for example, the client system can be tasked with providing read receipts to users specified on the read receipt distribution list. For example, the read receipt distribution list can be provided to a recipient client system as part of the received email. The recipient client system can identify the read receipt distribution list within the email, identify the users specified therein, and send read receipts, or notifications of the email being read, to each user specified on the read receipt distribution list. This configuration relieves the email server from the additional processing imposed by the read receipt distribution list apart from forwarding the read receipts from the client system. Further, in cases where the recipient client system does not support the functionality described within this specification, processing of the read receipt distribution list can be ignored or the data structure can be unrecognized. In that case, the recipient client system can perform conventional read receipt processing.

FIG. 4 is a flow chart illustrating another exemplary method 400 of email processing. FIG. 4 generally illustrates operations performed by the email server described with reference to FIG. 1. As pictured, FIG. 4 illustrates operations that can be performed by the email server to facilitate subscriptions to read receipts. More particularly, method 400 generally describes a process through which a user is able to subscribe to receive read receipts that are directed to a particular sender.

In block 405, the email server receives a read receipt subscription request from a user. The read receipt subscription request specifies a sender and one or more conditions. The sender specified by the read receipt subscription request is the sender to which read receipts are sent or directed. The conditions define the context in which a read receipt directed to the sender is directed to the (subscribing) user. In one aspect, the user can subscribe to receive all read receipts directed to the sender. In that case, the condition can specify "all" read receipts directed to the sender.

In another aspect, the condition, or conditions as the case may be, can restrict or limit the particular read receipts to which the user is subscribed. For example, the subscription can be limited to only read receipts for emails or emails of threads that include certain tags, include certain keywords words in the subject, include certain keywords in the body, or the like. In another example, the condition specify that only read receipts directed to the sender from a particular recipient, particular recipients, a particular domain, etc. are to be provided to the subscribed user. Any available technique or combination of techniques for filtering and/or classifying email can be used as a condition or conditions for a read receipt subscription request.

In block 410, the email server determines whether the user is permitted to subscribe to read receipts of the sender. The email server, for example, can include one or more rules defining the circumstances in which a user is permitted to subscribe to read receipts of a different user. In one example, the rules can refer to an organizational chart specifying a job or role hierarchy among users. In illustration, a first user that is considered higher in the hierarchy, e.g., a manager, supervisor, etc., of another second user may subscribe to receive read receipts of the second user. In another illustration, a first user may subscribe to receive read receipts of only those users that are directly managed by the first user. If the user is permitted to subscribe to the read receipts of the sender, method 400 continues to block 415. If not, method 400 can end.

In block 415, the email server subscribes the user to receive read receipts of the sender per the read receipt subscription request received in block 405. As noted, in order for the subscribing user to receive a read receipt directed to the sender, the condition(s) of the read receipt subscription request must be met.

In block 420, the email server monitors for read receipts directed to the sender. In block 425, the email server determines whether a read receipt that meets the subscription condition(s) is detected. For example, the email server can inspect the read receipt itself, e.g., for the email address and/or domain of the user that read the email, to determine whether the read receipt meets the subscription condition(s). In another example, the email server can identify the email or email thread with which the read receipt is associated and determine whether the associated email and/or emails meet the subscription condition(s). If so, method 400 proceeds to block 430. If not, method 400 continues to block 435.

In block 430, the email server sends the read receipt to the subscribed user. As noted, the read receipt can be provided to the subscribing user as if originally sent from the recipient to the subscribing user rather than as a forward of the read receipt from the sender of the email. It should be appreciated that the read receipt also can be provided to the sender as is performed in the conventional case of read receipt processing.

In block 435, the email server determines whether the subscription of the user has been cancelled. If the subscription has been cancelled, i.e., the subscribing user is no longer subscribed to receive read receipts directed to the sender, the method can end. For example, the subscribing user may have issued a cancellation of the subscription to the email server, the subscription may have automatically timed out or expired after a limited or predetermined amount of time, etc. If the subscribing user is still subscribed, method 400 can loop back to block 420 to continue processing.

Figure 5:
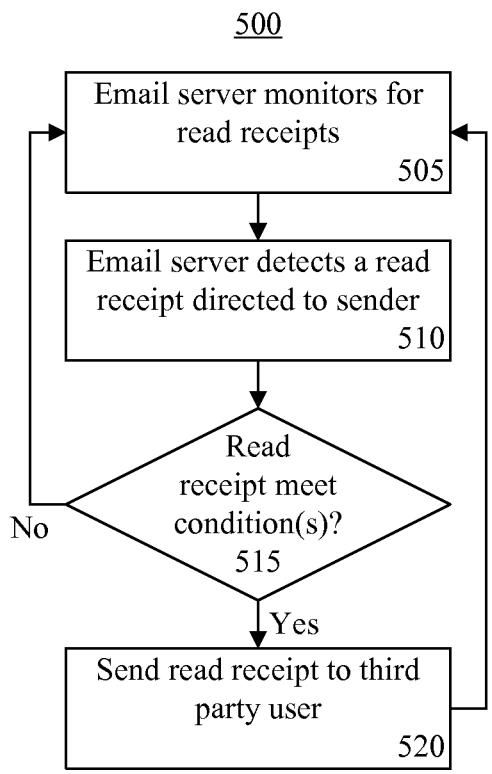
FIG. 5 is a flow chart illustrating another exemplary method of email processing.

FIG. 5 is a flow chart illustrating another exemplary method 500 of email processing. FIG. 5 generally illustrates operations performed by the email server described with reference to FIG. 1. FIG. 5 illustrates operations that can be performed by the email server where subscriptions are not required in order to send a read receipt to a third party user. For example, the email server can be configured with a service or other program code that recognizes particular situations or conditions that merit sending a read receipt to a third party user.

Method 500 can begin in a state where the email server is configured to evaluate read receipts and the particular emails that are associated with the read receipts. Accordingly, in block 505, the email server monitors for read receipts. In block 510, the email server detects a read receipt directed to a sender. In one aspect, the email server can evaluate all read receipts. In another aspect, the email server can be configured to evaluate all read receipts directed to only particular users, i.e., senders. For example, the email server can be configured to evaluate only those read receipts directed to a sender in customer service.

In block 515, responsive to detecting the read receipt of block 510, the email server determines whether the read receipt meets one or more conditions for sending the read receipt to a third party user. The conditions that must be met to send the read receipt to the third party user can define any of a variety of different situations and/or contexts. For example, the conditions can define a context in which elevated email handling is required. Consider a case in which a read receipt is received from a particular recipient and/or domain, e.g., one belonging to a customer, or a read receipt for an email with a particular tag, having or including an incident number, or other identifier. When the read receipt is determined to be associated with such an email or a thread including such an email, the email server can determine that the read receipt should be sent to a third party user due to the perceived importance of the email and read receipt.

Further, since no subscription is required and the sender did not specify the third party user, the third party user can be specified within the conditions defining the context. This allows the email server to select the particular third party user to which the read receipt is to be sent based upon the particular conditions that are met. For example, the email server can send the read receipt to a particular third party user when one or more of a first set of conditions are met, and to a different third party user when one or more of a second and different set of conditions are met.

As used herein, a determination that a read receipt meets one or more conditions means that the read receipt itself meet the condition(s) or that one or more emails associated with the read receipt meet the condition(s). If the email server determines that the read receipt meets the condition(s), the method proceeds to block 520. In block 520, the email server sends the read receipt to the third party user as specified by the condition(s) that were met. It should be appreciated that the email server can send the read receipt to more than one third party user in the case where the condition(s) that are met specify more than one third party user. If the read receipt does not meet the condition(s), method 500 loops back to block 505 to continue processing.

Though FIG. 5 has been described from the perspective of the email server, one or more aspects described with reference to FIG. 5 can be performed by a client system. In one aspect, for example, the sender client system can be tasked with providing read receipts to a third party user by applying the conditions as described. When the conditions are met, the sender client system sends the read receipt to the third party user or users in accordance with the condition(s) that are met.

Figure 6:
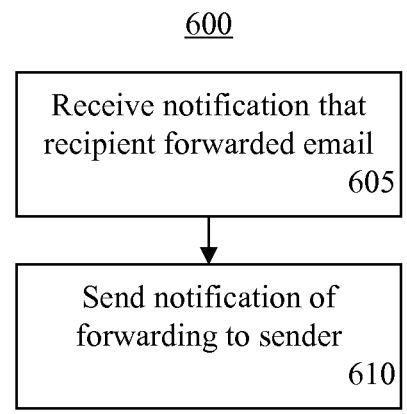
FIG. 6 is a flow chart illustrating another exemplary method of email processing.

FIG. 6 is a flow chart illustrating another exemplary method 600 of email processing. FIG. 6 generally illustrates operations performed by the email server described with reference to FIG. 1. Method 600 generally describes a process through which a sender is notified that a recipient has forwarded an email.

Method 600 begins in a state where the email server is configured to notify a sender that a recipient has forwarded an email to another user that is not a recipient of the email. In one aspect, the sender of an email can request such notifications from the email server by selecting an option when sending the email. In another aspect, the inclusion of a read receipt distribution list can cause the email server to provide notifications of the email being forwarded from a recipient to another user that is not a recipient automatically. In any case, the email server has sent an email from a sender to one or more recipients. The email includes a request that the sender be notified of the forwarding of the email.

In block 605, the email server receives a notification that at least one of the recipients of the email forwarded the email to at least one other user. In one aspect, the recipient client is configured to send a notification to the email server responsive to the email being forwarded. For example, the recipient client system can be configured to identify the request for notification of forwarding within the email and send a notification to the email server. In another aspect, the recipient client forwards the email via the email server, which detects the forwarding of the email since the email server is involved in the forwarding operation.

In block 610, the email server sends a notification of the forwarding to the sender. Responsive to the email server being notified or otherwise becoming aware that the email was forwarded, the email server sends a notification to the sender. The notification can indicate the recipient that forwarded the email, the time the email was forwarded, and the users to which the email was forwarded.

The inventive arrangements disclosed herein provide enhanced processing of read receipts for email. Using the various techniques disclosed herein, users other than a sender of an email can receive read receipts for an email. The users that receive read receipts can be recipients or third party users. Under certain defined circumstances, users can subscribe to the read receipts of other users. Further, the conditions under which read receipts are distributed may be automated in accordance with defined conditions.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method performed within an email server, comprising:
   receiving, by the email server and from a sender via an email client, an email addressed to a plurality of users and a read receipt distribution list;
   receiving, by a user not in the read receipt distribution list, a read receipt subscription request to receive read receipts for the sender;
   forwarding, by the email server, the email and a read receipt request to addresses of the plurality of users;
   receiving, by the email server and from one of the plurality of users, a read receipt for the email;
   determining, in response to the read receipt subscription being received, that the user not in the read receipt distribution list is permitted to subscribe;
   evaluating the read receipt to detect that a subscription condition associated with the read receipt subscription request is met;
   forwarding, by the email server using the read receipt distribution list, the received read receipt to users included in the read receipt distribution list; and
   forwarding, by the email server and based upon the evaluating, the received read receipt to the user not in the read receipt distribution list.

2. The method of claim 1, wherein
   the email client is configured to generate the read receipt distribution list by:
   displaying, within a user interface, the plurality of users to the sender, and
   presenting, within the user interface, a user interface element associated with the plurality of users by which the sender selects a subset of the plurality of addresses associated with the plurality of users from the plurality of users.

3. The method of claim 1, wherein
   the email client is configured to present, within the user interface, a directory by which the sender can select a selected user that is neither the sender nor one of the plurality of users to which the email is addressed.

4. The method of claim 1, wherein
   the subscription condition is met based upon the read receipt.

5. The method of claim 1, wherein
   the subscription condition is met based upon the email.

6. The method of claim 5, wherein
   the subscription condition is based upon a domain from which the read receipt is received.

7. The method of claim 5, wherein
   the subscription condition is based upon a particular tag contained within the email.

8. The method of claim 1, wherein
   the email server selects between multiple users not in the read receipt distribution list to receive the read receipt based upon a particular subscription condition being met.

9. The method of claim 1, wherein
   the evaluating the read receipt is performed only for a particular sender.

10. The method of claim 1, wherein
    the read receipt distribution list is generated by the sender.

11. A computer hardware system including an email server, comprising:
    a hardware processor programmed to initiate the following executable operations:
    receiving, by the email server and from a sender via an email client, an email addressed to a plurality of users and a read receipt distribution list;
    receiving, by a user not in the read receipt distribution list, a read receipt subscription request to receive read receipts for the sender;
    forwarding, by the email server, the email and a read receipt request to addresses of the plurality of users;
    receiving, by the email server and from one of the plurality of users, a read receipt for the email;
    determining, in response to the read receipt subscription being received, that the user not in the read receipt distribution list is permitted to subscribe;
    evaluating the read receipt to detect that a subscription condition associated with the read receipt subscription request is met;
    forwarding, by the email server using the read receipt distribution list, the received read receipt to users included in the read receipt distribution list; and
    forwarding, by the email server and based upon the evaluating, the received read receipt to the user not in the read receipt distribution list.

12. The system of claim 11, wherein
    the email client is configured to generate the read receipt distribution list by:
    displaying, within a user interface, the plurality of users to the sender, and
    presenting, within the user interface, a user interface element associated with the plurality of users by which the sender selects a subset of the plurality of addresses associated with the plurality of users from the plurality of users.

13. The system of claim 11, wherein
    the email client is configured to present, within the user interface, a directory by which the sender can select a selected user that is neither the sender nor one of the plurality of users to which the email is addressed.

14. The system of claim 11, wherein
    the subscription condition is met based upon the read receipt.

15. The system of claim 11, wherein
    the subscription condition is met based upon the email.

16. The system of claim 15, wherein
    the subscription condition is based upon a domain from which the read receipt is received.

17. The system of claim 15, wherein
    the subscription condition is based upon a particular tag contained within the email.

18. The system of claim 11, wherein
    the email server selects between multiple users not in the read receipt distribution list to receive the read receipt based upon a particular subscription condition being met.

19. The system of claim 11, wherein
    the evaluating the read receipt is performed only for a particular sender.

\* \* \* \* \*